United States Patent
Lee et al.

(10) Patent No.: US 10,614,970 B2
(45) Date of Patent: Apr. 7, 2020

(54) SWITCHGEAR HAVING EARTH SWITCH

(71) Applicant: LSIS CO., LTD., Anyang-si, Gyeonggi-do (KR)

(72) Inventors: Seog Won Lee, Anyang-si (KR); Young Woo Jeong, Anyang-si (KR); Yong Jin, Anyang-si (KR); Hyeok Su Shin, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 6 days.

(21) Appl. No.: 16/223,962

(22) Filed: Dec. 18, 2018

(65) Prior Publication Data
US 2019/0244768 A1 Aug. 8, 2019

(30) Foreign Application Priority Data

Feb. 6, 2018 (KR) .......................... 10-2018-0014808

(51) Int. Cl.
*H01H 3/00* (2006.01)
*H02B 13/00* (2006.01)
(Continued)

(52) U.S. Cl.
CPC .......... *H01H 3/001* (2013.01); *H01M 2/202* (2013.01); *H02B 13/00* (2013.01); *H02B 13/045* (2013.01); *H02B 13/075* (2013.01)

(58) Field of Classification Search
CPC H01H 3/001; H01H 3/42; H01H 3/46; H01H 31/28; H01H 31/003; H01H 31/02;
(Continued)

(56) References Cited

U.S. PATENT DOCUMENTS

| 2,954,449 A | * | 9/1960 | Lindell | H01H 33/126 |
| | | | | 200/48 R |
| 3,244,827 A | * | 4/1966 | Kussmaul | H01H 3/46 |
| | | | | 200/50.18 |

(Continued)

FOREIGN PATENT DOCUMENTS

| JP | H11102628 A | 4/1999 |
| JP | 2000340074 A | 12/2000 |

(Continued)

OTHER PUBLICATIONS

Korean Office Action for related Korean Application No. 10-2018-0014808; action dated Feb. 12, 2019; (31 pages).

*Primary Examiner* — William A Bolton
(74) *Attorney, Agent, or Firm* — K&L Gates LLP (57) ABSTRACT

According to an embodiment of the present invention, there is provided a switchgear including: a fixed electrode which is disposed inside a cabinet; a movable electrode which is provided corresponding to the fixed electrode and rotates between a first position which comes in contact with the fixed electrode and a second position which is separated from the fixed electrode; a pedal which is disposed on the outside of the cabinet and guided in the vertical direction along a guide hole formed long in the cabinet in the vertical direction; a connecting rod which is rotatably connected to the pedal; and a hammer which is connected to the connecting rod and rotates together with the connecting rod to strike the movable electrode positioned at the first position.

9 Claims, 7 Drawing Sheets

(51) Int. Cl.
*H02B 13/045* (2006.01)
*H02B 13/075* (2006.01)
*H01M 2/02* (2006.01)
*H01M 2/20* (2006.01)

(58) Field of Classification Search
CPC ...... H01H 33/02; H01H 31/00; H02B 13/045;
H02B 13/075; H02B 11/28; H02B 13/00;
H01M 2/202
USPC ...... 200/48 R, 48 A, 48 KB; 218/12, 45, 55,
218/79, 80
See application file for complete search history.

(56) References Cited

U.S. PATENT DOCUMENTS

| | | | |
|---|---|---|---|
| 3,676,749 A * | 7/1972 | Wilson ..................... | H01H 3/42 |
| | | | 361/609 |
| 8,570,121 B2 * | 10/2013 | Sawada ................... | H01H 3/28 |
| | | | 335/220 |
| 8,629,744 B2 * | 1/2014 | Prohaska ............... | H01H 83/20 |
| | | | 335/16 |
| 2009/0237869 A1 | 9/2009 | Kikukawa et al. | |
| 2012/0175234 A1 | 7/2012 | Sugai et al. | |

FOREIGN PATENT DOCUMENTS

| | | |
|---|---|---|
| JP | 2010073567 A | 4/2010 |
| JP | 4512648 B2 | 7/2010 |
| JP | 5380467 B2 | 1/2014 |

\* cited by examiner

FIG. 1

<RELATED ART>

FIG. 2

<RELATED ART>

SWITCHGEAR HAVING EARTH SWITCH

CROSS-REFERENCE TO RELATED APPLICATIONS

The present application claims priority under 35 U.S.C. § 119 and 35 U.S.C. § 365 to Korean Patent Application No. 10-2018-0014808 filed on Feb. 6, 2018, all of which are hereby incorporated by reference in their entirety.

BACKGROUND

The present invention relates to a switchgear, and more particularly, to a switchgear having an earth switch.

As the demand for electricity increases due to the development of industry, a power system is also becoming large capacity and super-high pressure, and according to this, stabilization and reliability of electric power facilities are very important.

Due to the surge in electricity demand, a high-Voltage Substation is in a tendency where a main circuit system thereof is sealed and concealed, and a control system thereof is rapidly changed to electronicization because of reasons such as a difficulty of securing a place to use, excessive maintenance cost, and ensuring stability, and is changing from an existing air or oil insulated substation to a gas insulated substation.

Generally, a switchgear is a device which is provided in a power transmission line or a power distribution line, performs opening/closing in a normal state, and stably protects a power system by opening a line in an abnormal state such as a ground fault and a short circuit.

The switchgear can be classified into an air-insulated switchgear (AIS), a solid-insulated switchgear (SIS), a gas-insulated switchgear (GIS), or the like according to an insulating medium.

The switchgear is an electrical device which is installed between a power supply side and a load side of the electric system, and protects a power system and a load device by safely cutting off the current when the circuit is opened or closed artificially in a normal current state or when an abnormal current such as a ground fault and a short circuit is generated.

Such a switchgear includes a bushing unit, a main bus, a gas circuit breaker, a disconnector switch, an earth switch, a current transformer, a moving unit, a control unit, and the like, which generally receive electricity from the high voltage power supply.

Here, the earth switch (ES) is a device which is installed at both ends of a circuit breaker, and serves to earth the main circuit manually during maintenance and inspection and to remove the current left in the conductors during maintenance or inspection of equipment.

Figure 1:
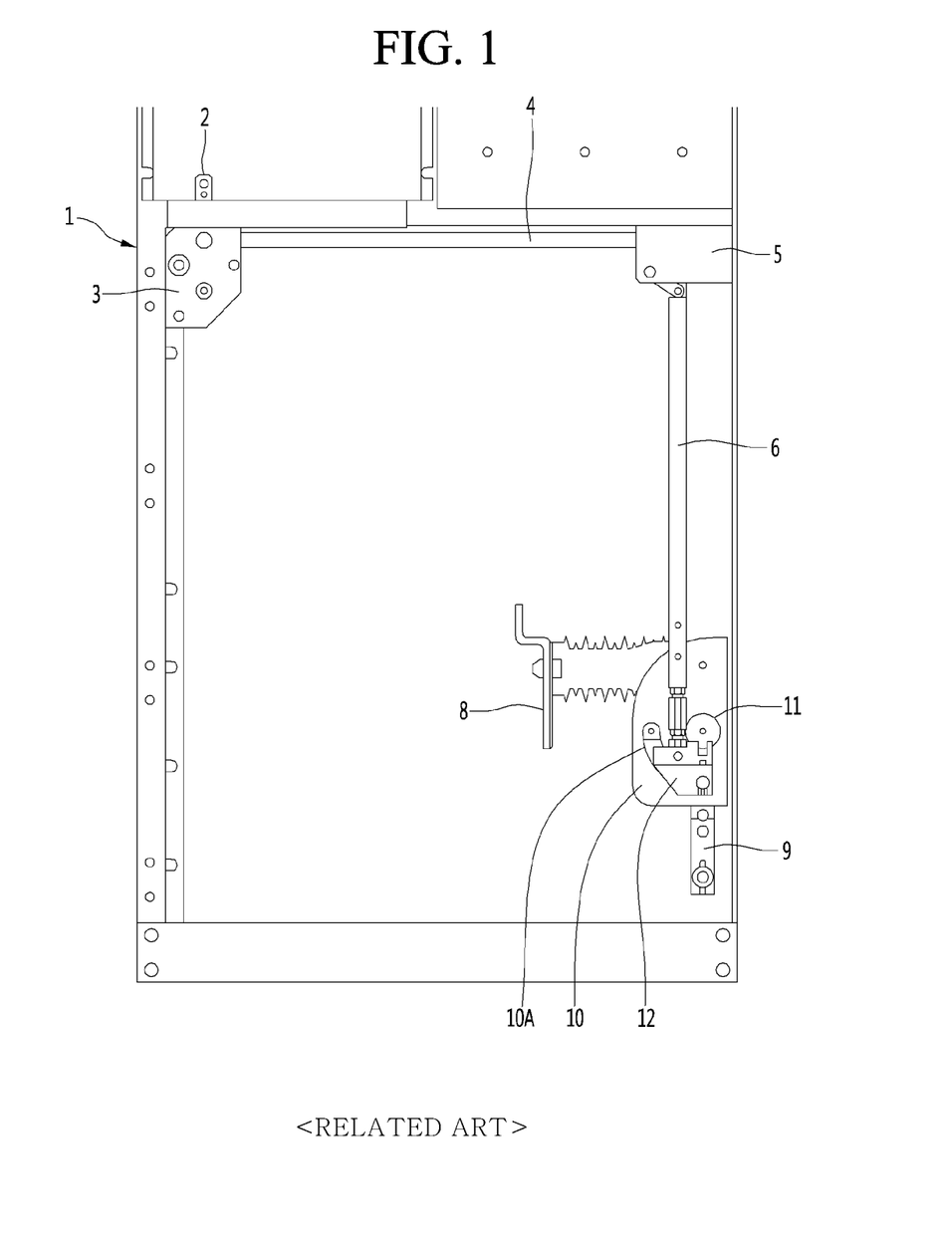
FIG. 1 is a view illustrating a state where the earth switch of the switchgear according to the related art is disconnected.
Figure 2:
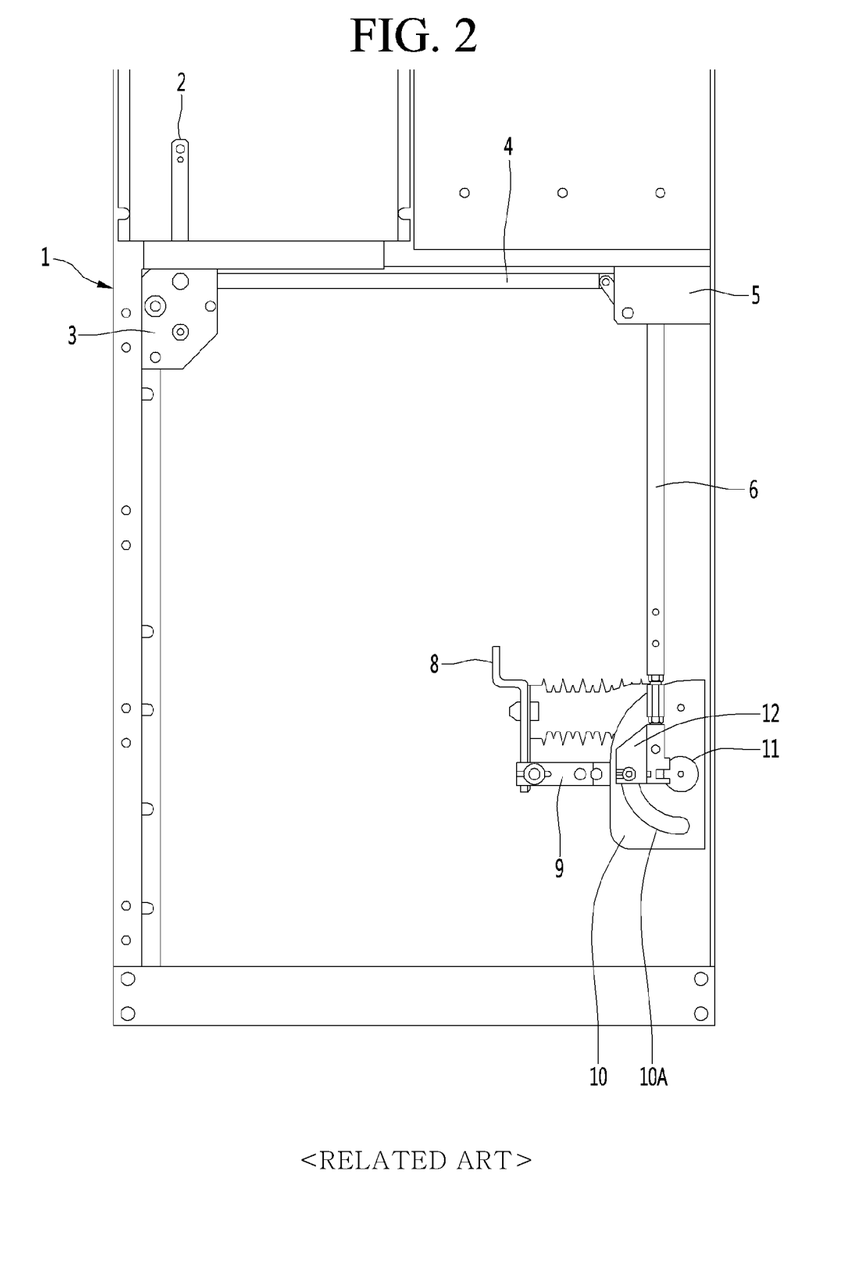
FIG. 2 is a diagram illustrating a state where the earth switch of the switchgear according to the related art is connected.

FIG. 1 is a view illustrating a state where the earth switch of the switchgear according to the related art is disconnected, and FIG. 2 is a diagram illustrating a state where the earth switch of the switchgear according to the related art is connected.

As illustrated in FIGS. 1 and 2, the earth switch may be disposed inside a cabinet 1 of the switchgear of the related art. The earth switch may include a link 2 which is connected to an earth switch mechanism (not illustrated) and moves in the vertical direction, a horizontal connecting rod 4 which moves left and right according to the movement of the link 2, a vertical connecting rod 6 which move in the vertical direction according to the movement of the horizontal connecting rod 4, a mover 12 which rotates in accordance with the movement of the vertical connecting rod 6; a movable electrode 9 which rotates together with the mover 12; and a fixed electrode 8 which is connected to the movable electrode 9 and comes in contact with or is separated from the movable electrode 9.

The power of the link 2 can be transmitted to the horizontal connecting rod 4 by a first gear box 3 and the power of the horizontal connecting rod 4 can be transmitted to the vertical connecting rod 6 by a second gear box 5.

The movable electrode 9 can rotate together with the mover 12 about a rotation shaft 11 and can be come into contact with or separated from the fixed electrode 8 by the rotation motion thereof. The rotation shaft 11 may be provided in the supporter 10 and the supporter 10 may be provided with a guide hole 10A for guiding the rotation of the mover 12.

However, in a case of the switchgear of the related art, there is a problem that, in a case where a large current corresponding to the fault current is energized in a state where the fixed electrode 8 and the movable electrode 9 are in contact with each other, or the fixed electrode 8 and the movable electrode 9 which are connected to a system having a state of a living line are in contact with each other, some fusion may occur between the fixed electrode 8 and the movable electrode 9. A mechanism having a very large opening force is required to overcome the fusion and to separate the fixed electrode 8 and the movable electrode 9, which may lead to an increase in manufacturing cost and a shortening of the life of the earth switch.

The related technical literature of the present invention includes KR 20-2010-0011682 U (published Dec. 1, 2010) and KR 20-0437070 U (registered Oct. 25, 2007).

SUMMARY

An objective of the present invention to be solved by the present invention is to provide a switchgear in which a fixed impact force is applied to a movable electrode to separate a fusion of a movable electrode and a fixed electrode and to easily open an earth switch.

According to an embodiment of the present invention, there is provided a switchgear including: a fixed electrode which is disposed inside a cabinet; a movable electrode which comes provided corresponding to the fixed electrode and rotates between a first position which is in contact with the fixed electrode and a second position which is separated from the fixed electrode; a pedal which is disposed on the outside of the cabinet and guided in the vertical direction alone; a guide hole formed long in the cabinet in the vertical direction; a connecting rod which is rotatably connected to the pedal; and a hammer which is connected to the connecting rod and rotates together with the connecting rod to strike the movable electrode positioned at the first position.

The movable electrode positioned at the first position may be positioned within the rotation radius of the hammer and the movable electrode positioned at the second position may be positioned outside the rotation radius of the hammer.

The hammer may include a body portion which rotates while keeping a predetermined angle with the connecting rod; and a head portion which is provided at an end portion of the body portion to strike the movable electrode.

The connecting rod and the body portion may rotate about the same rotation shaft.

The angle between the connecting rod and the body portion may be an acute angle.

An elastic member which is connected to at least one of the connecting rod and the hammer and applies an elastic force in a direction in which the hammer moves away from the movable electrode positioned at the first position.

The movable electrode may come in contact with a lower side of the fixed electrode and the hammer may strike the movable electrode from the upper side.

The rotation shaft of the hammer may be positioned above the rotation shaft of the movable electrode.

The connecting rod may have a connecting hole formed long in a longitudinal direction of the connecting rod, and the pedal may have a connection portion inserted into the connecting hole through the guide hole.

DETAILED DESCRIPTION OF THE EMBODIMENTS

Hereinafter, preferred embodiments of the present invention will be described with reference to the accompanying drawings, which are intended to specifically illustrate the present invention in a manner that allows a person skilled in the art to easily carry out the invention and this does not mean that the technical idea and scope of the invention are limited.

It is needless to say that the switchgear having the earth switch according to the present invention (hereinafter referred to as "switchgear") is preferably an air-insulated switchgear (AIS), but is not limited thereto, and can be a gas-insulated switchgear (GIS).

The switchgear according to an embodiment of the present invention includes a fixed electrode 105 which is disposed inside a cabinet 100; a movable electrode 106 which is provided corresponding to the fixed electrode 105 and rotates between a first position which is in contact with the fixed electrode 105 and a second position which is separated from the fixed electrode; a pedal 102 which is disposed outside the cabinet 100 and vertically guided along a guide hole 103 formed long in the cabinet 100 in the vertical direction; a connecting rod 104 which is rotatably connected to the pedal 102; and a hammer 109 which is connected to the connecting rod 104 and rotates together with the connecting rod 104 to strike the movable electrode 106 positioned at the first position. Hereinafter, a more detailed description will be given.

Figure 3:
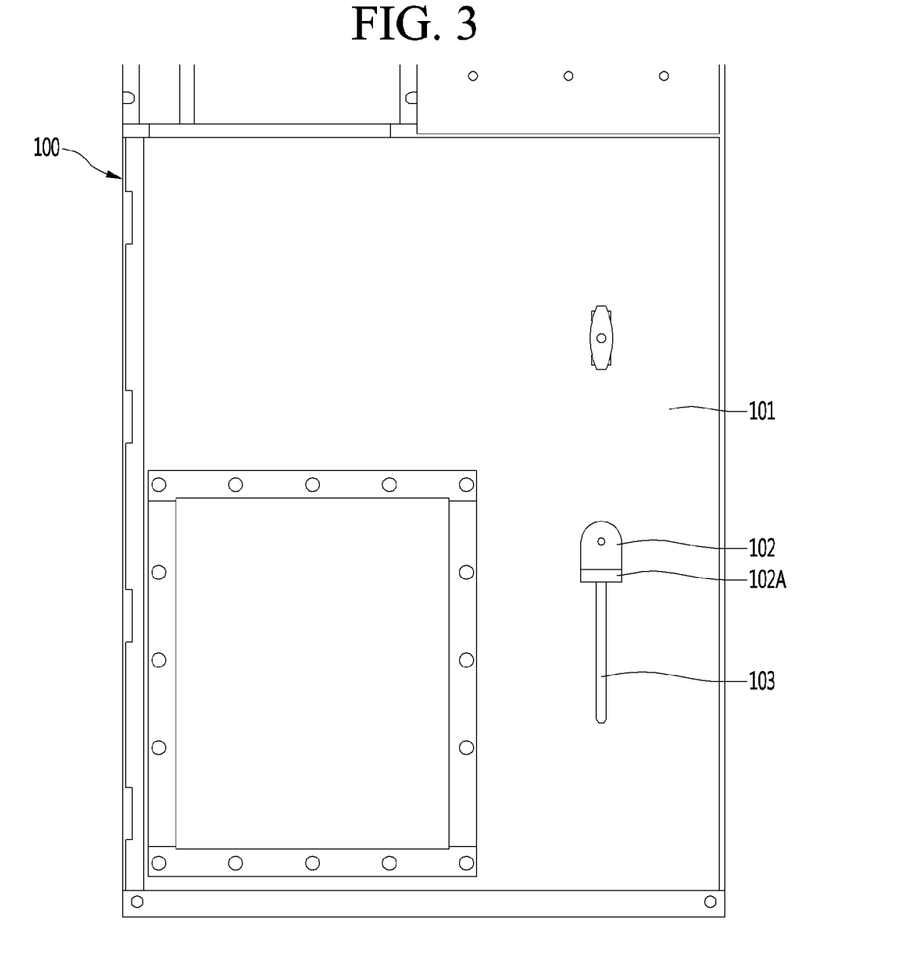
FIG. 3 is a front view of a switchgear according to an embodiment of the present invention.
Figure 4:
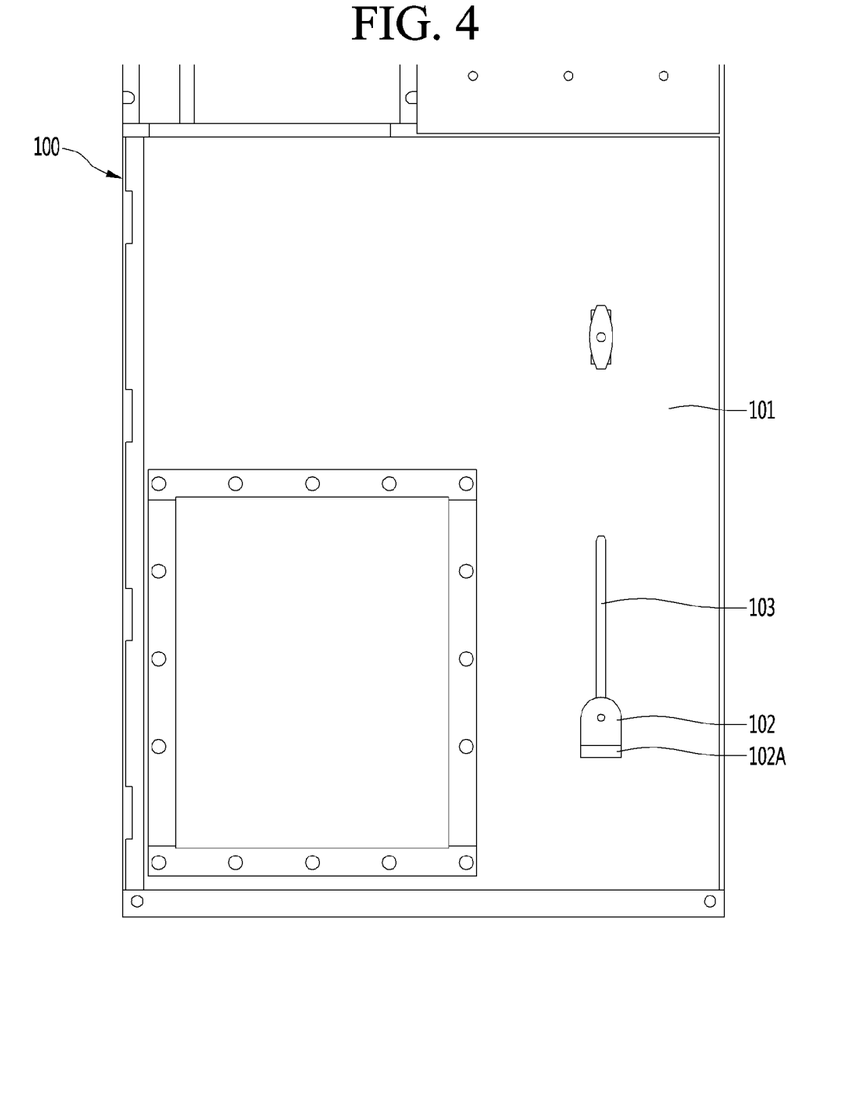
FIG. 4 is a front view illustrating a case where an external force is applied to a pedal of the switchgear illustrated in FIG. 3.

FIG. 3 is a front view of a switchgear according to an embodiment of the present invention and FIG. 4 is a front view illustrating a case where an external force is applied to a pedal of the switchgear illustrated in FIG. 3.

The cabinet 100 can form an external shape of the switchgear. The cabinet 100 may be formed of a single member but is preferably formed of a plurality of members fastened to each other.

A front door 101 may be provided on a front surface of the cabinet 100. The front door 101 is openable and closable so that the operator can open the front door 101 and access the inside of the cabinet 100.

A guide hole 103 may be formed on the front door 101. The guide hole 103 may be formed as a long hole formed long in a vertical direction. The guide hole 103 can guide the pedal 102 in the vertical direction.

The pedal 102 may be disposed outside the cabinet 100. More specifically, the pedal 102 may be disposed in front of the front door 101. The pedal 102 can be guided in the vertical direction along the guide hole 103.

The pedal 102 may be normally positioned at an upper end of the guide hole 103 as illustrated in FIG. 3.

On the other hand, when the operator applies an external force by stepping on the pedal 102, more specifically, a pressing portion 102A of the pedal 102, by a foot thereof, the pedal 102 may descend to a lower end of the guide hole 103 as illustrated in FIG. 4. When the operator removes the external force, the pedal 102 can be moved to the upper end of the guide hole 102 again.

Since the pedal 102 is positioned outside the cabinet 100, the operator can operate the hammer 109 (see FIG. 5) described below without opening the front door 101.

Figure 5:
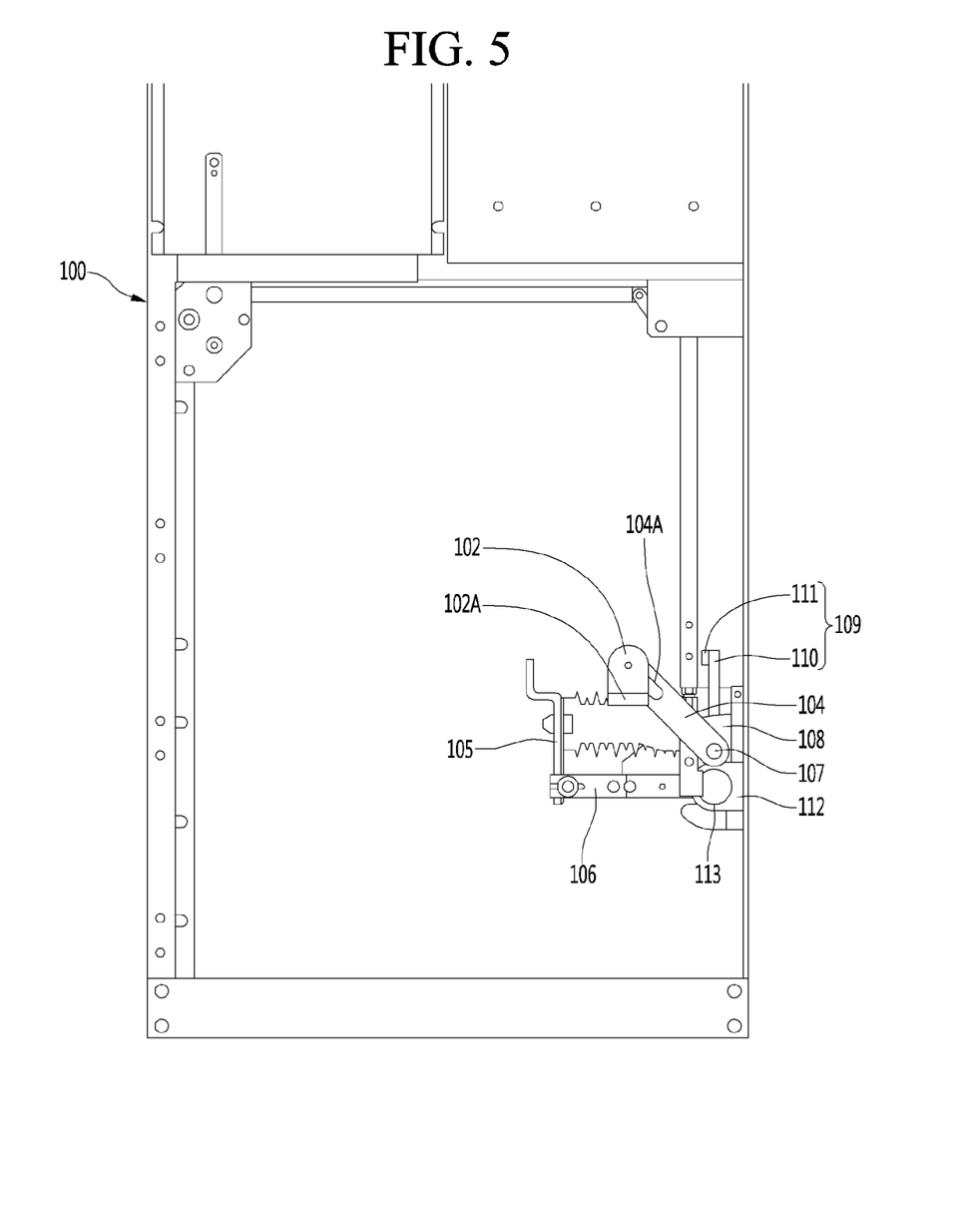
FIG. 5 is a view illustrating a state where fusion between a fixed electrode and a movable electrode of the switchgear according to an embodiment of the present invention is generated.
Figure 6:
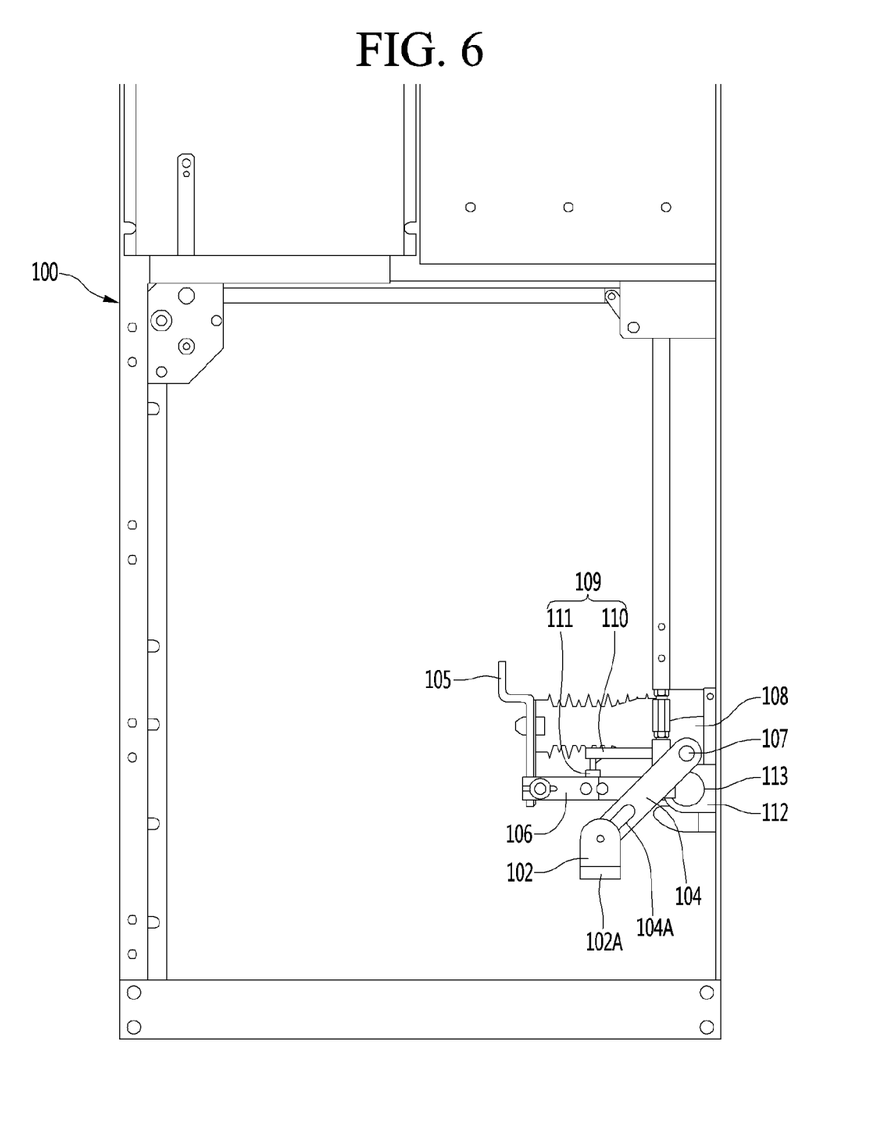
FIG. 6 is a view illustrating a state where a hammer illustrated in FIG. 5 strikes the movable electrode.
Figure 7:
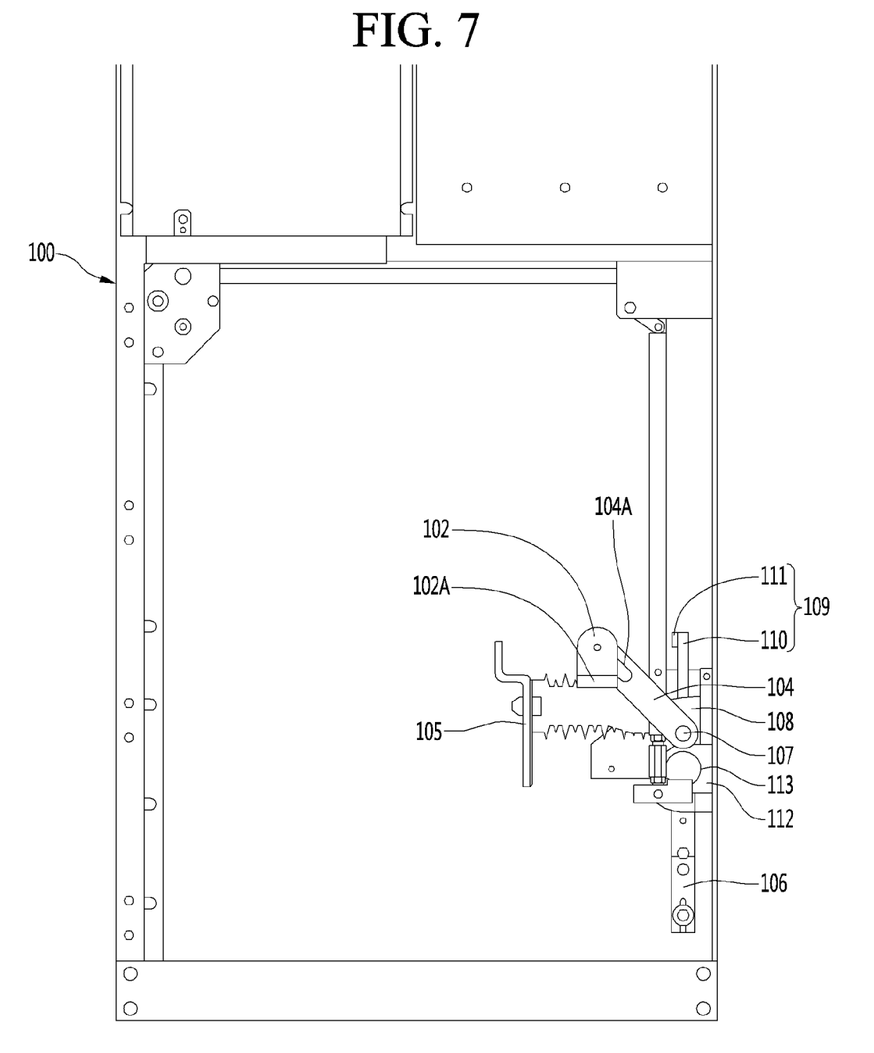
FIG. 7 is a view illustrating a state where the fixed electrode and the movable electrode illustrated in FIG. 6 are separated from each other.

FIG. 5 is a view illustrating a state where fusion between the fixed electrode and the movable electrode of the switchgear according to an embodiment of the present invention is generated, FIG. 6 is a view illustrating a state where the hammer illustrated in FIG. 5 strikes the movable electrode, and FIG. 7 is a view illustrating a state where the fixed electrode and the movable electrode illustrated in FIG. 6 are separated from each other.

The fixed electrode 105 may be positioned inside the cabinet 100. For example, the fixed electrode 105 may be positioned in a cable chamber.

The movable electrode 106 may be provided corresponding to the fixed electrode 105.

The movable electrode 106 is rotatably provided and can come in contact with or separated from the fixed electrode 105.

The movable electrode 106 can come in contact with and be separated from the lower side of the fixed electrode 105.

A position at which the movable electrode 106 comes in contact with the fixed electrode 105 may be referred to as a first position and a position at which the movable electrode 106 is separated from the fixed electrode 105 may be referred to as a second position. The movable electrode 106 can be rotated between the first position and the second position. When the movable electrode 106 is positioned at the first position and comes in contact with the fixed electrode 105, the earth switch can be connected. When the movable electrode 106 is positioned at the second position and separated from the fixed electrode 105, the earth switch can be opened.

The movable electrode 106 is rotatably provided on the first supporter 112 and is rotatable about the rotation shaft 113. The movable electrode 106 can be rotated by an earth switch mechanism (not illustrated), which is a well-known technique, and thus a detailed description thereof will be omitted.

Meanwhile, the connecting rod 104 may be rotatably connected to the pedal 102 described above.

More specifically, the connecting rod 104 may be provided with a connecting hole 104A formed long in the longitudinal direction of the connecting rod 104, and a connection portion (not illustrated) protruding rearward may be provided on a back surface of the pedal 102. The connection portion may be inserted into the connection hole 104A formed in the connecting rod 104 through the guide hole 103 (see FIG. 3) formed in the from door 101 (see FIG. 3)

When the pedal 102 moves in the vertical direction, the connecting rod 104 can rotate around the rotation shaft 107.

In a case where the pedal 102 is positioned at the upper end of the guide hole 103 or at the lower end, the connection portion can come in contact with one end of the connection hole 104A farther from the rotation shaft 107 among both ends of the connection hole 104A. In a process of moving the pedal 102 between the upper end and the lower end of the guide hole 103, the connection portion can move in a direction toward the rotation shaft 107 in the connection hole 104A.

The hammer 109 is connected to the connecting rod 104 and can rotate together with the connecting rod 104. The hammer 109 can strike the movable electrode 106 positioned at the first position. In other words, the hammer 109 can strike the movable electrode 106 in contact with the fixed electrode 105.

The rotation shaft 107 of the connecting rod 104 may be the same as the rotation shaft 107 of the hammer 109. The connecting rod 104 and the hammer 109 may be rotatably provided on a second supporter 108. The connecting rod 104 can be positioned and rotated in front of the second supporter 108 and the hammer 109 can be positioned and rotated behind the second supporter 108.

The height from the bottom surface of the cabinet to the first supporter 112 may be lower than the height from the bottom surface of the cabinet to the second supporter 108. With this configuration, it is easy for the hammer 109 to strike the movable electrode 106 from the upper side.

The movable electrode 106 positioned at the first position may be positioned within the rotation radius of the hammer 109 and the movable electrode 106 positioned at the second position may be positioned outside the rotation radius of the hammer 109. In other words, the hammer 109 may rotate and strike the movable electrode 106 in contact with the fixed electrode 105, but may not strike the movable electrode 106 in a state separated from the fixed electrode 105. Therefore, since the hammer 109 does not strike the movable electrode 106 even if the pedal 102 is stepped on in a state where the fixed electrode 105 and the movable electrode 106 are separated from each other, it is possible to prevent malfunction or breakage of components thereof due to a mistake of an operator.

The hammer 109 may include a body portion 110 which rotates while keeping a predetermined angle with the connecting rod 104 and a head portion 111 which is provided at an end portion of the body portion 110 to strike the movable electrode 106.

The body portion 110 and the connecting rod 104 rotate about the same rotation shaft 107 so that the angle between the connecting rod 104 and the body portion 110 can be kept at an acute angle. Accordingly, the rotational force of the connecting rod 104 can be directly transmitted to the body portion 110.

The head portion 111 may be positioned at the end portion of the body portion 110 and may be configured to strike the movable electrode 106.

The rotation shaft 107 of the hammer 109 may be positioned above the rotation shaft 113 of the movable electrode 106. Therefore, the hammer 109 strikes the movable electrode 106 from the upper side so that the impact force transmitted to the movable electrode 106 becomes stronger due to the rotational force and the self-weight of the hammer 109 and the fusion between the fixed electrode 105 and the movable electrode 106 can be easily released.

In addition, the switchgear according to an embodiment of the present invention may further include an elastic member (not illustrated) connected to at least one of the connecting rod 104 and the hammer 109. The elastic member may exert an elastic force in a direction away from the movable electrode 106 in a state where the hammer 109 is in contact with the fixed electrode 105. Accordingly, when the operator removes the external force applied to the pedal 102, the hammer 109 and the connecting rod 104 are rotated in a direction away from the movable electrode 106 by the elastic force of the elastic member and the pedal 102 can be moved upward.

As an example, the body portion 110 of the hammer 109 may be provided with a coil spring (not illustrated) connected to the inside surface of the cabinet 100. The coil spring is stretched when the hammer 109 rotates toward the movable electrode 106 and can apply an elastic force in a direction of reducing the coil spring.

As another example, a torsion spring (not illustrated) may be provided on the rotation shaft 107 of the hammer 109 and the connecting rod 104. The torsion spring may be configured to apply an elastic force in a direction opposite to rotation when the hammer 109 rotates toward the movable electrode 106.

Hereinafter, the operation of the switchgear according to one embodiment of the present invention will be described.

The earth switch may be connected as illustrated in FIG. 5 to cause fusion between the fixed electrode 105 and the movable electrode 106 in a state where the fixed electrode 105 and the movable electrode 106 are in contact with each other. At this time, when the operator presses the pedal 102, the pedal 102 can move downward along the guide hole 103 formed in the front door 101. As illustrated in FIG. 6, the power of the pedal 102 is transmitted to the connecting rod 104 so that the connecting rod 104 and the hammer 109 can rotate together downward, and the hammer 109 strikes the upper side of the movable electrode 106 so that fusion between the fixed electrode 105 and the movable electrode 106 can be released.

As illustrated in FIG. 7, when the operator removes the external force applied to the pedal 102, the pedal 102 is moved upward by the elastic member (not illustrated), and the connecting rod 104 and the hammer 109 are rotated upward. In addition, the earth switch can be opened by rotating the movable electrode 106 downward so as to be separated from the fixed electrode 105 by an earth switch mechanism (not illustrated).

According to a preferred embodiment of the present invention, the fusion between the movable electrode and the fixed electrode can be separated by striking the movable electrode by the hammer. Thereby, the opening operation of the earth switch can be easily performed.

In addition, the operator can easily operate the hammer by only pressing the pedal.

The above description is merely illustrative of the technical idea of the present invention, and various modifications and changes may be made by those skilled in the art without departing from the essential characteristics of the present invention.

Therefore, the embodiments disclosed in the present invention are not intended to limit but to describe the technical idea of the present invention, and the scope of the technical idea of the present invention is not limited by these embodiments.

The scope of protection of the present invention should be construed according to the following claims, and all technical ideas within the scope of equivalents thereof should be construed as being included in the scope of the present invention.

What is claimed is:

1. A switchgear comprising:
   a fixed electrode which is disposed inside a cabinet;
   a movable electrode which is provided corresponding to the fixed electrode and rotates between a first position which comes in contact with the fixed electrode and a second position which is separated from the fixed electrode;
   a pedal which is disposed outside of the cabinet and guided in a vertical direction along a guide hole formed long in the cabinet in the vertical direction;
   a connecting rod which is rotatably connected to the pedal; and
   a hammer which is connected to the connecting rod and rotates together with the connecting rod to strike the movable electrode positioned at the first position.

2. The switchgear according to claim 1,
   wherein the movable electrode positioned at the first position is positioned within a rotation radius of the hammer, and
   wherein the movable electrode positioned at the second position is positioned outside the rotation radius of the hammer.

3. The switchgear according to claim 1,
   wherein the hammer includes:
   a body portion which rotates while keeping a predetermined angle with the connecting rod; and
   a head portion which is provided at an end portion of the body portion to strike the movable electrode.

4. The switchgear according to claim 3,
   wherein the connecting rod and the body portion rotate about a same rotation shaft.

5. The switchgear according to claim 3,
   wherein an angle between the connecting rod and the body portion is an acute angle.

6. The switchgear according to claim 1, further comprising:
   an elastic member which is connected to at least one of the connecting rod and the hammer and applies an elastic force in a direction in which the hammer moves away from the movable electrode positioned at the first position.

7. The switchgear according to claim 1,
   wherein the movable electrode comes in contact with a lower side of the fixed electrode, and
   wherein the hammer strikes the movable electrode from an upper side.

8. The switchgear according to claim 7,
   wherein a rotation shaft of the hammer is positioned above a rotation shaft of the movable electrode.

9. The switchgear according to claim 1,
   wherein the connecting rod has a connecting hole formed long in a longitudinal direction of the connecting rod, and
   wherein the pedal has a connection portion inserted into the connecting hole through the guide hole.

* * * * *